Dec. 8, 1931.     R. V. MORGENSTERN     1,836,000
REPEATER FOR SIGNALING CIRCUITS
Filed Feb. 7, 1930

Inventor
R. V. Morgenstern
by Eugene C. Brown
Attorney

Patented Dec. 8, 1931

1,836,000

UNITED STATES PATENT OFFICE

RONALD V. MORGENSTERN, OF METUCHEN, NEW JERSEY, ASSIGNOR TO THE WESTERN UNION TELEGRAPH COMPANY, OF NEW YORK, N. Y., A CORPORATION OF NEW YORK

REPEATER FOR SIGNALING CIRCUITS

Application filed February 7, 1930. Serial No. 426,676.

This invention relates to repeaters and terminal sets for signaling circuits in general. More particularly this invention relates to signaling apparatus in which thermionic vacuum tubes are employed to control the energization of generator field circuits in accordance with signaling energy impressed upon circuits of the vacuum tubes.

An object of this invention is to provide a thermionic vacuum tube, having circuits thereof associated with lines of a signal transmission system, for controlling the energization of a plurality of field windings of a generator in accordance with signals transmitted over the signal transmission system.

Another object of this invention is to provide a thermionic vacuum tube, having circuits thereof associated with lines of a signal transmission system, for unbalancing electrically balanced field windings of a generator in accordance with signals transmitted over the signal transmission system.

Still another object of their invention is to provide circuits for controlling the field excitation of a generator repeater in accordance with signaling energy by unequally energizing selected field windings of the generator.

A further object is to provide a plurality of thermionic vacuum tubes for controlling the magnitude and duration of the field excitation of a generator in accordance with signaling energy impressed upon circuits of the thermionic vacuum tubes.

Other features and objects of this invention will be apparent to those skilled in the art to which this invention pertains from the following specification and the appended claims:

In accordance with this invention signaling energy is impressed upon the input circuit of a thermionic vacuum tube, the output circuit of which has a plurality of field windings of a generator associated therewith whereby the conditions of excitation of the field of the generator are controlled in accordance with the signaling energy impressed upon the input circuit of the tube. In modified forms of this invention a plurality of thermionic vacuum tubes are arranged to control the exciting current supplied to the field windings of generator in accordance with incoming signals.

This invention will be more fully understood from the following specification and the drawings, in which briefly, Figure 1 illustrates an embodiment of this invention employing a single three element thermionic vacuum tube for controlling a generator having three field windings.

Figure 1:
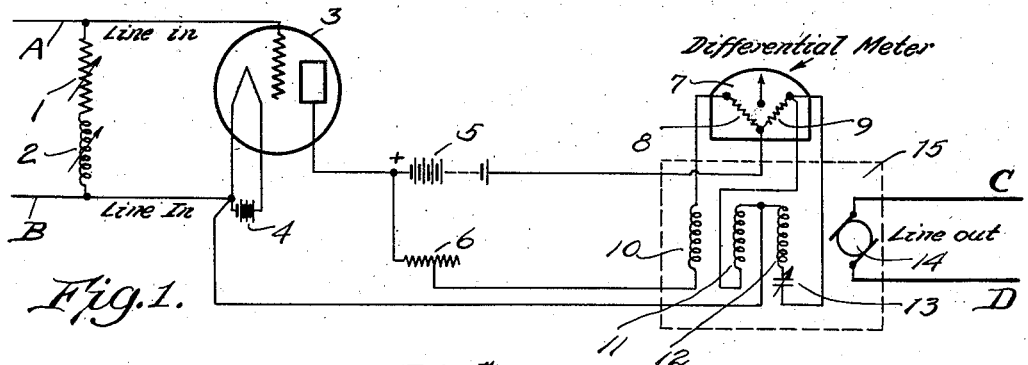

Referring in detail to Figure 1 of the drawings reference numeral 1 designates a variable resistance connected in series with a variable inductance 2 between the control or grid electrode and the cathode of the thermionic vacuum tube 3. Incoming signal transmission lines A and B are connected across the resistance 1 and inductance 2 to the grid electrode and cathode of the vacuum tube 3 for impressing signaling energy upon the circuits thereof. Source 4 is provided for supplying heating current to the cathode of the vacuum tube 3. Source 5 which is provided to supply the anode current to the vacuum tube 3 is connected through the winding 9 of the differential meter 7 and the winding 11 of the field circuit of the generator 15 to the cathode. The winding 8 of the meter 7 is connected across the source 5 through another field winding 10 of the generator 15 and the variable resistance 6. Field winding 12 is connected in series with the variable condenser 13 across the field winding 11. The windings 10 and 11 are arranged in circuit so that the magnetic fluxes set up by currents flowing through them from the source 5 will be in opposition. The armature 14 is connected to the outgoing lines C and D.

In operation the variable resistance 6 of the embodiment of this invention illustrated in Figure 1 is adjusted until the deflection of the differential meter 7 is zero when no signaling energy is being impressed upon the input circuit of the vacuum tube 3. The currents flowing through the windings 10 and 11 of the field of the generator 15 are then equal, and the magnetic fluxes of these windings just neutralize each other so that no potential exists across the armature terminals of the generator 15. When signals are transmitted to the input circuit of the repeater over lines A and B an increase or decrease in the current flowing through the field winding 11 will be effected. If the signals impressed upon the input of the repeater are of such polarity as to cause the grid electrode of the thermionic vacuum tube 3 to be at a positive potential with respect to the cathode, then the anode current through the tube will increase and the magnetic flux set up by the winding 11 will also increase. The potential across the armature 14 of the generator will then cause a signal to be transmitted over the lines C D in a certain direction. When the signal impressed upon the input of the thermionic tube 3 is of such a polarity as to cause the grid electrode to become negative with respect to the cathode, the anode current is then caused to decrease in accordance with the signal, and the excitation of the field winding 11 consequently also decreases. The magnetic field of the winding 10 will then predominate over that of the winding 11. Since the magnetic fields of the windings 10 and 11 are in opposition to each other the field of winding 10 will cause a potential to exist across the armature 14 of generator 15 in a sense opposite to that caused by the field of winding 11. The signals transmitted over the lines C and D will be in a certain direction when the grid potential of the thermionic vacuum tube 3 is caused to increase with respect to the potential of the filament by the incoming signals and in the opposite direction when the potential of the grid electrode of tube 3 is caused to decrease with respect to that of the cathode by the incoming signals. It is, of course, apparent that the proper grid electrode biasing potential may be provided between the grid electrode and the cathode of tube 3 in order to operate this tube over any desired portion of its grid voltage—anode current characteristic curve. Line distortion of incoming signals can be corrected by adjusting the resistance 1 and inductance 2 of the shunt circuit across the input of the thermionic vacuum tube 3, to give this shunt circuit the proper impedance and phase angle in relation to the line circuit.

Where it is desired to compensate for the attenuation caused by the transmission lines particularly on signals of the higher frequencies an additional field winding 12 which is connected across the winding 11 through the condenser 13 is provided. By proper adjustment of the condenser 13 with respect to the inductance of the winding 12 the current through the field winding 12 can be made to increase as the frequency increases. As a result of this the potential across the armature 14 will increase as the frequency increases. Since the effect of a line is to attenuate the higher frequency signals to a greater extent than the low frequency signals, the final result of increasing the applied potential at the transmitting end of the line as the frequency of the signal increases is that the relationship of the signals arriving at the receiving end of the line will be substantially as originally transmitted, that is, they will be equally attenuated in so far as frequency attenuation is concerned.

Figure 2:
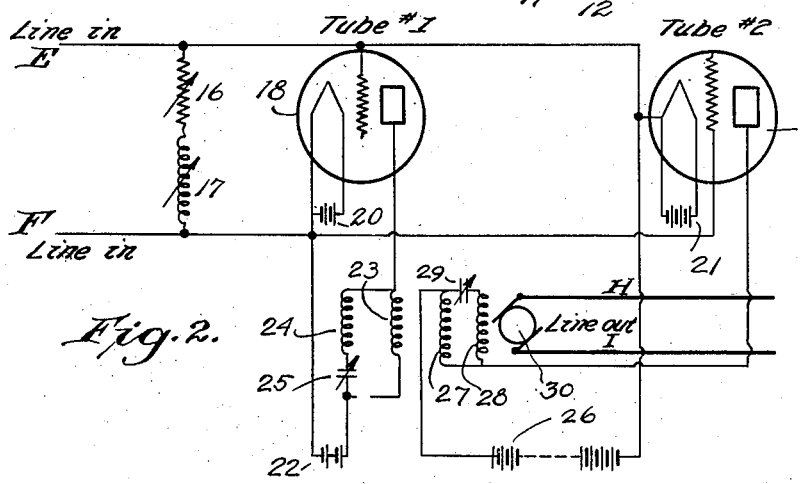
Figure 2 illustrates a modified form of this invention in which a plurality of thermionic vacuum tubes are employed in independent field windings of a generator.

In Figure 2 of the drawings an embodiment of this invention wherein two thermionic vacuum tubes are employed is illustrated. Variable resistance 16 and variable inductance 17 are connected between the incoming lines E and F and between the grid electrode and cathode of thermionic vacuum tubes 18 and 19. The connections to the tubes 18 and 19 are reversed in that the line E is connected to the grid electrode of tube 18 and the cathode of tube 19 while the line F is connected to the cathode of tube 18 and the grid electrode of tube 19. Sources 20 and 21 are provided for heating the cathodes of the tubes 18 and 19, respectively, to the proper temperature. It is, of course, understood that a single source of heating current may be employed in place of sources 20 and 21 where tubes 18 and 19 are of the type in which the cathodes are electrically insulated from the heating electrodes. A source of anode current 22 is connected between the cathode and anode of the tube 18 through the field winding 23. An additional field winding 24 is connected in shunt with the winding 23 through the variable condenser 24.

A source of anode current supply 26 for tube 19 is connected between the cathode and anode thereof through the field winding 27. The magnetic fields set up by the windings 23 and 27 are in opposition to each other. A field winding 28 is connected in shunt to the winding 27 through a variable condenser 29.

The armature 30 of the generator, with which are associated the field windings 23, 24, 27 and 28, is connected to the outgoing lines H and I.

In the arrangement of this invention illustrated in Figure 2 the grid potential anode current characteristics of the thermionic vacuum tubes 18 and 19 must be substantially alike for successful operation of the arrangement. When no signaling energy is impressed upon the input circuits of the tubes 18 and 19 the anode currents in the anode circuits of these tubes will set up magnetic fluxes in the windings 23 and 27 which will neutralize the effects of one another upon the armature 30. When a signal is impressed upon the input circuits of tubes 18 and 19 in such a manner that the grid electrode of tube 18 is positive and the grid electrode of tube 19 is negative with respect to the cathodes of tubes 18 and 19, respectively, the anode current through the field winding 23 will increase and that through the field winding 27 will decrease. The effect of the magnetic field of winding 23 will then predominate and a potential of positive polarity will be impressed across the lines H and I. If the signals impressed upon the input circuits of tubes 18 and 19 are such as to cause the grid electrode of tube 19 to be at a positive potential with respect to the cathode thereof the anode current through the field winding 27 will increase and the magnetic field set up by this winding will predominate over the magnetic field set up in the winding 23, since the current through this latter winding will decrease, and a potential of negative polarity is caused to exist between the lines H and I.

Figure 3:
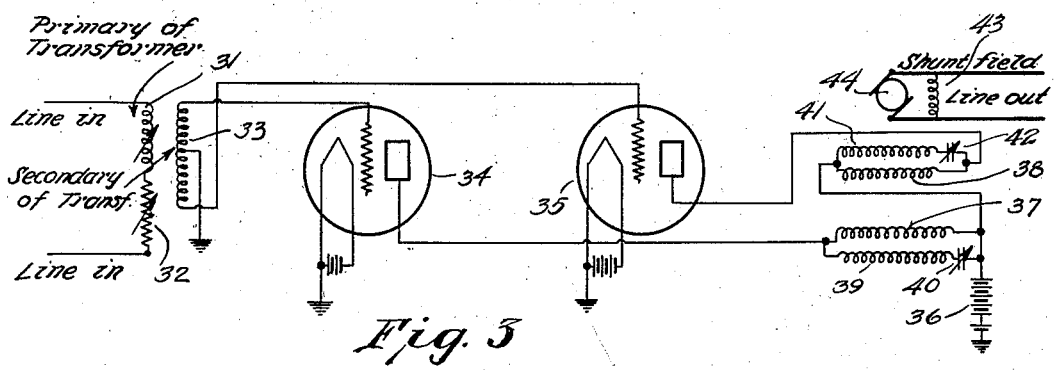
Figure 3 illustrates a further modification of this invention in which a plurality of thermionic vacuum tubes are employed to control the polarity and duration of energization of a plurality of field windings of a generator.

In the embodiment of this invention illustrated in Figure 3 of the drawings, a transformer comprising the variable inductance primary winding 31, which is connected to the incoming lines through the variable resistance 32, and the secondary 33, which is variably coupled to the primary 31, is employed to couple the incoming lines to the input circuits of thermionic vacuum tubes 34 and 35. The center of the secondary 33 is connected to ground. The cathodes of tubes 34 and 35 are also connected to ground. The ends of the secondary 33 are connected to the grid electrodes of tubes 34 and 35. The source 36 of anode current supply is connected to the anode of tube 34 through the field winding 37 and to the anode of tube 35 through the field winding 38. Field winding 39 is connected in shunt with winding 37 through the condenser 40, and another field winding 41 is connected in series with the condenser 42 across the winding 38. A shunt field core 43 is connected across the armature 44 and the outgoing lines.

In the arrangement illustrated in Figure 3 the grid electrodes of the thermionic vacuum tubes 34 and 35 are energized by signaling energy from the incoming line only as long as the current through the primary 31 is changing. As soon as the steady state is reached in the current flow through the primary 31 no potential due to signaling energy will be applied to the grid electrodes of tubes 34 and 35, although a direct current potential exists across the primary. In order that signal current may still be transmitted over the outgoing line as long as the steady potential exists on the incoming line even though no grid potential is applied to the grid electrodes of the tubes through the action of signaling energy, the shunt winding 43 is provided across the armature 44. The field set up by this shunt winding by a current generated in the armature 44 when the field windings associated with the output circuits of the thermionic vacuum tubes 34 and 35 are energized, through the action of the initial impulse of a signal, is sustained, since shunt generators are self-exciting. The steady portion of signals transmitted over the incoming lines is thus reproduced on the outgoing lines in the proper polarity.

Windings 37 and 41 are provided to compensate for frequency attenuation of the outgoing line in the manner described in conjunction with the description of Fig. 1.

Figure 4:
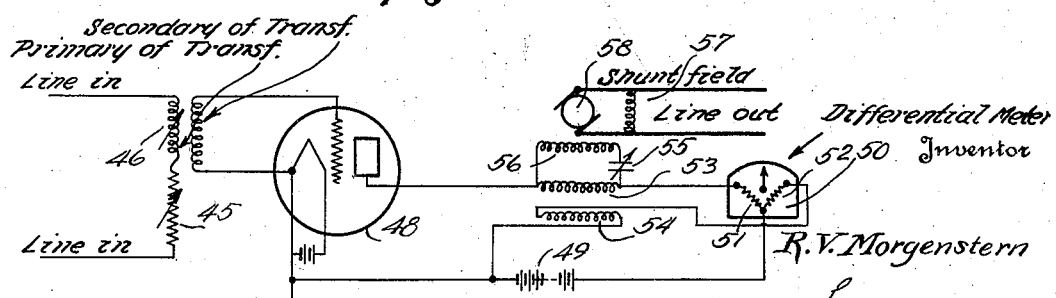
Figure 4 illustrates a further embodiment of this invention which is similar to that illustrated in Figure 3.

Another arrangement in which a single thermionic vacuum tube 48 is coupled to the incoming line thereof, the transformer 46, the primary of which is connected to the incoming lines through the resistance 45, for transmitting signaling impulses to the field windings of a generator associated with the outgoing line is illustrated in Figure 4 of the drawings. This arrangement also employs a shunt field 57 which is connected across the armature 58, for exciting the generator while the steady portion of the signal is being transmitted from the incoming line to the outgoing line.

The current flowing through the field winding 54 and the winding 52 of the differential meter 50 from the source 49 is adjusted to be of the same magnitude as the current flowing through the anode circuit of the thermionic vacuum tube 48, the field winding 53, and the winding 51 of the differential meter 50 from the source 49. When signaling energy is impressed upon the incoming line and is increasing in value, a potential proportional to the rate of change of this signaling energy is impressed between the grid electrode and the cathode of the thermionic vacuum tube 48. This causes the current through the field winding 53 to either increase or to decrease, depending upon whether the grid electrode is positive or negative with respect to the cathode. If the current through the field 53 increases, then the magnetic field set up by it will predominate over the field set up by the current through the winding 54, and a positive impulse will be sent from the armature 58 over the outgoing line. A current will also flow through the shunt winding 57, which will maintain the excitation of the generator so that the positive signal will continue to be transmitted over the line as long as it is being transmitted over the incoming line. When the incoming signal ceases, the magnetic flux through the windings of transformer 46 collapses, and momentarily generates a negative potential which is impressed upon the grid of the tube 48. The current through the field winding 53 is thereby caused to decrease by an amount equal to the increase at the beginning of the signal impulse, thus causing the field of winding 54 to momentarily predominate and overcome the effect of the shunt field 57. Thus the current impulse in the outgoing line ceases with the termination of the incoming impulse, the small shunt field 57 being always dominated by the generator fields 53 and 54.

An auxiliary field winding 56 connected in series with the variable condenser is connected across the winding 53. The auxiliary winding circuit is adjusted to compensate for frequency attenuation of the outgoing lines at the higher frequencies so that the high and low frequency signals will be transmitted with the same facility and will be received at the end of the outgoing line at the same given level.

It is, of course, understood that while I have described several embodiments of my invention in detail, variations may be made therein without departing from the scope of my claims. Any of the arrangements shown in Figures 1, 2, 3 and 4 can be applied to a duplexed telegraph circuit by placing the input circuit of the vacuum tubes and apparatus associated with them across the proper points of a correctly designed bridge and carrying the armature connections of the generator to the proper points on the outgoing bridge in the duplex circuit on the line wires to which it is desired to repeat signals.

I claim:

1. In a signaling system the combination of a thermionic vacuum tube having input and output currents, a generator having a plurality of field windings, one of said field windings being associated with the output circuit of said thermionic vacuum tube, and another of said field windings being connected in shunt with the armature of said generator.

2. In a signaling system the combination of a thermionic vacuum tube having input and output circuits, a generator having a plurality of field windings, selected ones of said field windings being associated with the output circuit of said thermionic vacuum tube, said field windings being arranged to normally neutralize the excitation effect on said generator, said thermionic vacuum tube being arranged to disturb the neutralized effect of said field windings when a signal is impressed upon the input circuit thereof.

3. In a signaling system the combination of a thermionic vacuum tube, a variable impedance associated with the input circuit of said tube, a generator, a plurality of field windings associated with said generator, connections between selected ones of said field windings and the output circuit of said thermionic vacuum tube and means connected in circuit with each of said field windings for indicating when the magnetizing effect of selected ones of said field windings is the same.

4. In a signaling system the combination of a thermionic vacuum tube, a generator having a plurality of field windings, selected ones of said field windings being associated with the output circuit of said vacuum tube, one of said field windings being shunted across the armature of said generator, and variable reactance means being associated with one of said field windings.

5. In a signaling system the combination of a plurality of thermionic vacuum tubes, means for impressing signaling energy upon the input circuits of said vacuum tubes, a generator having a plurality of field windings, selected ones of said field windings being arranged to set up magnetic fields in opposition, connections between the output circuits of said thermionic vacuum tubes and said field windings whereby the potential across the armature of said generator is controlled by the signaling energy impressed upon said input circuits, and means associated with one of said field windings for increasing the excitation of said generator with increase in signal frequency.

6. In a signaling system the combination of a plurality of thermionic vacuum tubes, means for impressing signaling energy upon the input circuits of said vacuum tubes, a generator having a plurality of field windings, selected ones of said field windings being associated with the output circuits of said thermionic vacuum tubes, at least one of said field windings being connected in shunt with said armature, said shunt winding being arranged to excite said generator during the duration of a steady signal impulse.

7. In a signaling system the combination of a plurality of thermionic vacuum tubes, means for impressing signaling energy upon circuits of said vacuum tubes, a generator, field windings of said generator associated with circuits of said vacuum tubes, said field windings being balanced within themselves to prevent excitation of said generator under normal conditions, connections between said field windings and circuits of said vacuum tubes whereby energy is impressed upon the circuits of said field windings when signaling energy is impressed upon the circuits of said tubes, whereby said balanced condition in said field windings is disturbed, and means associated with one of said field windings for increasing the excitation of said generator with increase in signal frequency.

8. In a signaling system, a repeater comprising a generator provided with an armature and a plurality of field windings, an incoming line connected to control the energization of one of said field windings in accordance with incoming signals, and an outgoing line and another of said field windings connected across said armature.

In testimony whereof I affix my signature.

RONALD V. MORGENSTERN.